(12) United States Patent
Lin et al.

(10) Patent No.: US 8,144,461 B2
(45) Date of Patent: Mar. 27, 2012

(54) LEATHER COATING STRUCTURE FOR A CASE AND METHOD FOR MANUFACTURING THEREOF

(75) Inventors: San-Fang Lin, Taipei (TW); Hui-Wen Chiu, Taipei (TW); Yen-Yu Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1300 days.

(21) Appl. No.: 11/619,751

(22) Filed: Jan. 4, 2007

(65) Prior Publication Data
US 2007/0158221 A1  Jul. 12, 2007

(30) Foreign Application Priority Data
Jan. 9, 2006  (TW) ............................... 95100800 A

(51) Int. Cl.
*G06F 1/16* (2006.01)
(52) U.S. Cl. ................................. 361/679.55
(58) Field of Classification Search ............. 361/679.55, 361/679.33
See application file for complete search history.

(56) References Cited

U.S. PATENT DOCUMENTS

| | | | | |
|---|---|---|---|---|
| 2,250,888 | A | * | 7/1941 | Chandler .......................... 69/21 |
| 5,295,089 | A | * | 3/1994 | Ambasz ................... 361/679.09 |
| 5,870,282 | A | | 2/1999 | Andre et al. |
| 6,125,033 | A | * | 9/2000 | Andre et al. ............. 361/679.55 |
| 6,400,562 | B1 | | 6/2002 | Lee et al. |
| 2003/0002909 | A1 | * | 1/2003 | Jeffries et al. ................. 400/714 |
| 2004/0100449 | A1 | | 5/2004 | Chuang et al. |

FOREIGN PATENT DOCUMENTS

| | | |
|---|---|---|
| CN | 1418052 | 5/2003 |
| CN | 2552087 | 5/2003 |
| JP | 4-108220 | 9/1992 |
| JP | 6-068253 | 9/1994 |
| JP | 6274456 | 9/1994 |
| JP | 10-256738 | 9/1998 |
| JP | 2001-057477 | 2/2001 |
| JP | 2002-032178 | 1/2002 |
| JP | 2004320310 | 11/2004 |
| TW | 532498 | 5/2003 |
| TW | 573937 | 1/2004 |

(Continued)

OTHER PUBLICATIONS

English language translation of abstract of CN 2552087.

(Continued)

*Primary Examiner* — Dameon Levi
*Assistant Examiner* — Theron Milliser
(74) *Attorney, Agent, or Firm* — Thomas, Kayden, Horstemeyer & Risley, LLP

(57) ABSTRACT

A leather coating structure for a case includes a supporting plate with a top surface and a bottom surface assembled onto a upper cover of a portable electronic apparatus, and a leather coating layer with a top portion which covers the top surface and a extended portion which extends from the top portion to cover a portion of the bottom surface. The manufacturing method for the leather coating structure is also disclosed. A leather coating layer is attached onto a supporting plate to form a leather coating structure, the leather coating layer is bent at the edge of the supporting plate to cover a portion of the bottom surface, and then the leather coating structure is assembled onto an upper cover of a portable electronic apparatus.

18 Claims, 6 Drawing Sheets

FOREIGN PATENT DOCUMENTS

TW 584368 4/2004

OTHER PUBLICATIONS

English language translation of abstract of CN 1418052.
English language translation of abstract and pertinent parts of JP 6274456.
English language translation of abstract and pertinent parts of TW 532498.
English language translation of abstract and pertinent parts of TW 573937.
English language translation of abstract and pertinent parts of TW 584368.
English language translation of abstract of JP4-108220.
English language translation of abstract of JP6-068253.
English language translation of abstract of JP10-256738.
English language translation of abstract of JP2001-057477.
English language translation of abstract of JP2002-032178.
English language translation of abstract of JP2004320310.

* cited by examiner

LEATHER COATING STRUCTURE FOR A CASE AND METHOD FOR MANUFACTURING THEREOF

RELATED APPLICATIONS

The present application is based on, and claims priority from, Taiwan Application Serial Number 95100800, filed Jan. 9, 2006, the disclosure of which is hereby incorporated by reference herein in its entirety.

BACKGROUND OF THE INVENTION

1. Field of Invention

The invention relates to a leather coating structure for a case and, in particular, to a separable leather coating structure for a case for a portable electronic apparatus and a method for manufacturing thereof.

2. Related Art

In some portable electronic apparatus, leather material is often coated onto the user operating panel region (i.e., the surface of the upper cover) for better appearance and feeling. Take an ordinary laptop computer as an example, the conventional way of attaching the leather is to cut a piece of leather into the desired shape and then attach it to a predetermined region on the upper cover. However, the upper cover surface structure constructed by such method often has the following problems: bad cutting may distort the shape of the leather and improper cutting may result in rough edges.

The upper cover is the area that the user directly touches the most during use. The leather piece conventionally attached to the upper cover structure is likely to be peeled off or be damaged if the user constantly touches the leather edge during operations. In particular, the leather is often peeled from the bending edge.

FIG. 1 is a schematic view of the upper cover 130 of a conventional laptop computer. The drawing shows that a leather coating structure 110 is directly attached onto the lower region of the keyboard 102. It shows further drawbacks that the leather is likely to have a detached surface layer 112 and a rough edge 114 if it is attached using the conventional method.

It is therefore desirable to provide a new upper cover design that can avoid the above-mentioned damage.

SUMMARY OF THE INVENTION

It is an objective of the invention to provide a leather coating structure for a case and the manufacturing method thereof to avoid the leather coating structure from separating from and peeling-off on the upper cover of a portable electronic apparatus.

Another objective of the invention is to provide a leather coating structure for a case and the manufacturing method thereof so that when the leather is attached improperly or a portion of the leather is damaged, another set of coating can replace it immediately without abandoning the entire upper cover.

In accordance with the above objectives, the disclosed leather coating structure includes a supporting plate and a leather coating layer. The supporting plate has a top surface and a bottom surface assembled onto an upper cover of a portable electronic apparatus. The leather coating layer includes a top portion and a extended portion. The top portion covers the top surface, and the extended portion extends from the top portion to cover a portion of the bottom surface.

According to a preferred embodiment of the invention, the disclosed leather coating structure for a case is used for the upper cover of a laptop computer. The material of the upper cover is an aluminum-magnesium alloy or a plastic plate. The supporting plate is a plastic or metal plate. The thickness of the extended portion of the leather coating layer can be reduced down to 0.3~0.6 mm in contrast to 0.8~1.2 mm of the top portion. This can reduce the protrusion of the leather coating layer at the edge of the supporting plate. When the leather coating structure is assembled onto the upper cover of a laptop computer, the extended portion is on the inner side of the supporting plate.

When the leather coating structure has an inner opening, the disclosed leather coating structure further includes a coating frame to cover the edge of the inner opening. This prevents the edge of the leather coating layer from being exposed and peeled. The coating frame can be plastic or metal.

The disclosed leather coating structure manufacturing method is applicable to a portable electronic apparatus with a supporting plate and a leather coating layer. The supporting plate has a bottom surface inside an upper cover of the portable electronic apparatus. The method includes the steps of: attaching the leather coating layer on the supporting plate to form the leather coating structure for a case, bending the leather coating layer at the edge of the supporting plate to cover a portion of the bottom surface, and assembling the leather coating structure onto the upper cover of the portable electronic apparatus.

In a preferred embodiment of the invention, an adhesive is used to attach the leather coating layer onto the supporting plate. The leather coating structure is assembled onto the upper cover of the electronic apparatus. When the leather coating structure has an inner opening, a coating frame is used to cover the edge of the inner opening, thereby preventing the rough edges of the inner opening from being exposed.

Therefore, using the disclosed leather coating structure for a case can prevent the leather from exposing its rough edges when it is attached onto the upper cover. It also prevents the leather from peeling off if the user carelessly touches and/or rubs the edges of the leather coating layer during operation. The disclosed separable leather coating structure design allows one to readily replace the leather coating structure of the upper cover. When the operation of assembling the leather coating structure onto the upper cover fails, one only needs to replace it with another leather coating structure without abandoning the entire upper cover.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

This specification discloses an upper cover leather coating structure of a portable electronic apparatus. By combining a leather coating layer and a supporting plate while having a leather coating extended portion, it prevents the exposure of rough edges on the leather coating assembled onto the upper cover. This prevents the leather from peeling off at the edges or corners where the user constantly touches them during operations. Besides, the module design of the supporting plate enables one to readily replace the upper cover leather coating structure.

The case of the electronic apparatus referred herein is the outer shielding case for holding support of the electronic apparatus.

Figure 1:
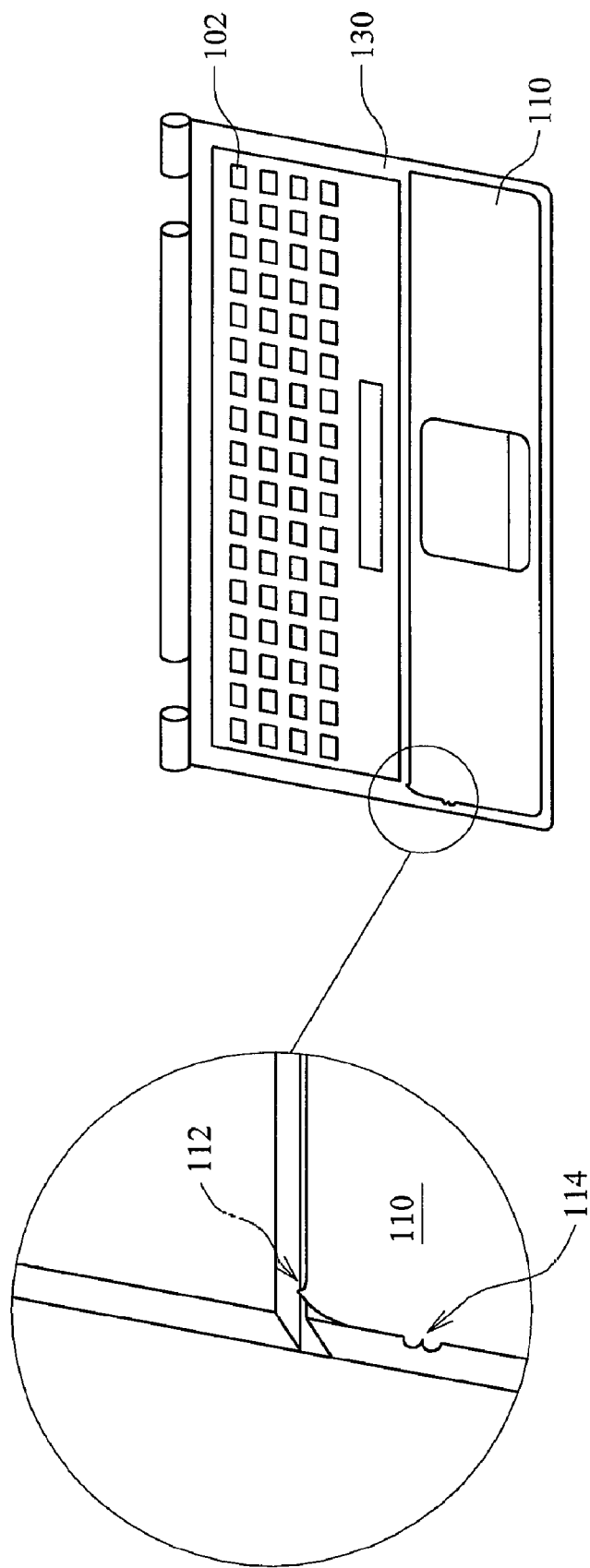
FIG. 1 is a schematic view of the conventional upper cover of a laptop computer.
Figure 2A:
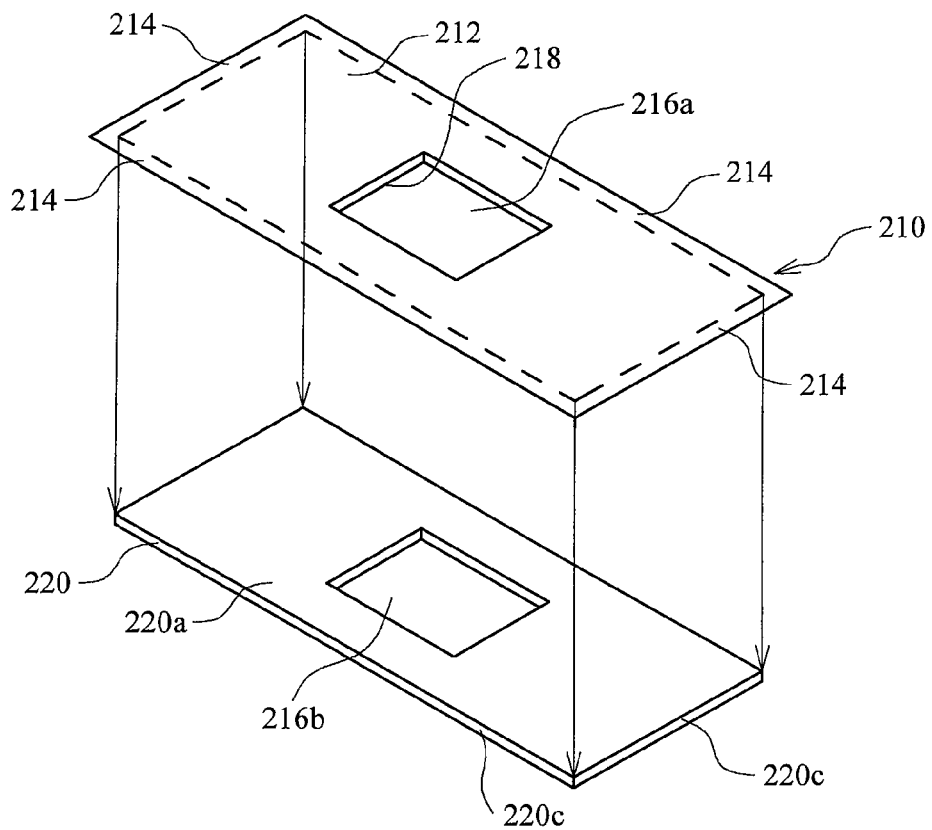
FIG. 2A is an exploded view of the leather coating structure of a preferred embodiment of the invention.
Figure 2B:
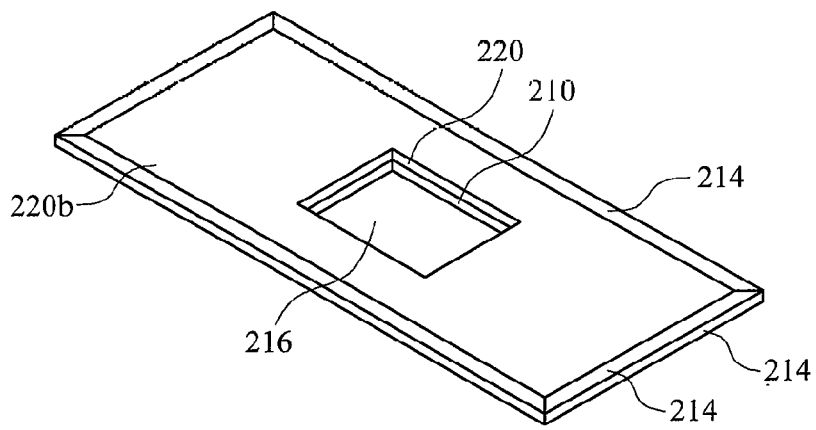
FIG. 2B is a bottom view of the leather coating structure of a preferred embodiment of the invention.

With simultaneous reference to FIGS. 2A and 2B, the leather coating structure 200 for a case includes a supporting plate 220 and a leather coating layer 210. The supporting plate 220 is assembled onto the upper cover 230 of a portable electronic apparatus. The leather coating layer 210 covers the supporting plate 220 and includes a top portion 212 and an extended portion 214.

The top portion 212 covers the top surface 220a of the supporting plate 220. The extended portion 214 extends from the top portion 212, crosses and covers the edge 220c of the supporting plate 220 and a portion of the bottom surface 220b. That is, the leather coating layer 210 corresponding to the edge 220c of the supporting plate is bended to form the extended portion 214 covering a portion of the bottom surface 220b of the supporting plate 220.

The surface of the supporting plate 220 to which the top portion 212 is attached is called the top surface 220a. Its opposite surface is called the bottom surface 220b. When the leather coating structure is assembled onto the upper cover of the electronic apparatus, the top portion 212 is exposed. The bottom surface and the extended portion covering a portion of the bottom surface are inside the upper cover.

The disclosed leather coating structure for a case includes a supporting plate and a leather coating layer covering it. The supporting material in this embodiment is a plastic plate, but not limited to this. It can be made of any other material such as a metal. In an embodiment of the invention, the leather coating layer can be NAPPA, vegetable tan, top grain, Nu buck, split leather, or oil leather. The average thickness of the top portion is 0.8~1.2 mm.

Figure 3A:
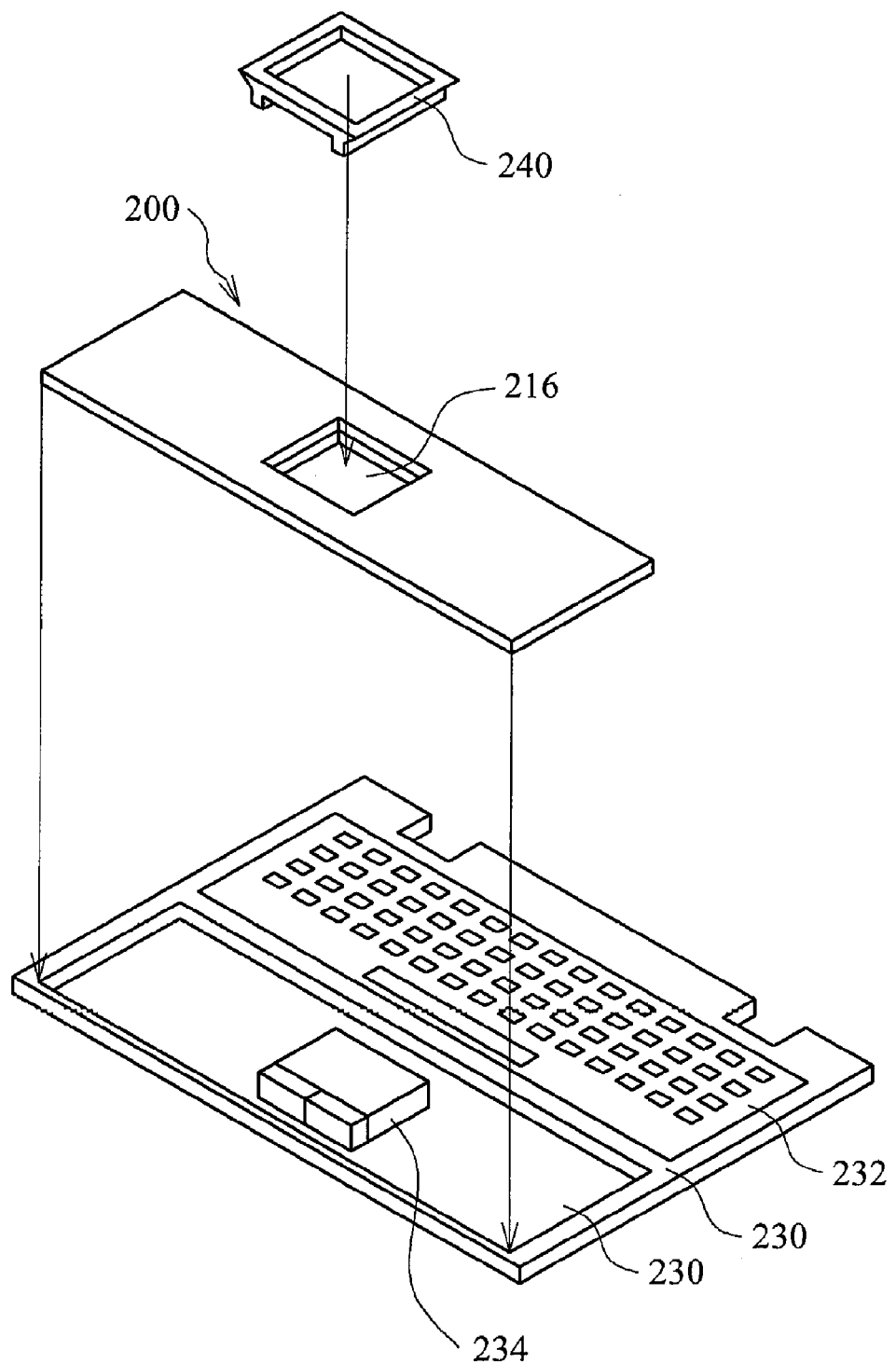
FIG. 3A is a schematic view of the disclosed leather coating structure and an electronic apparatus before the assembly.
Figure 3B:
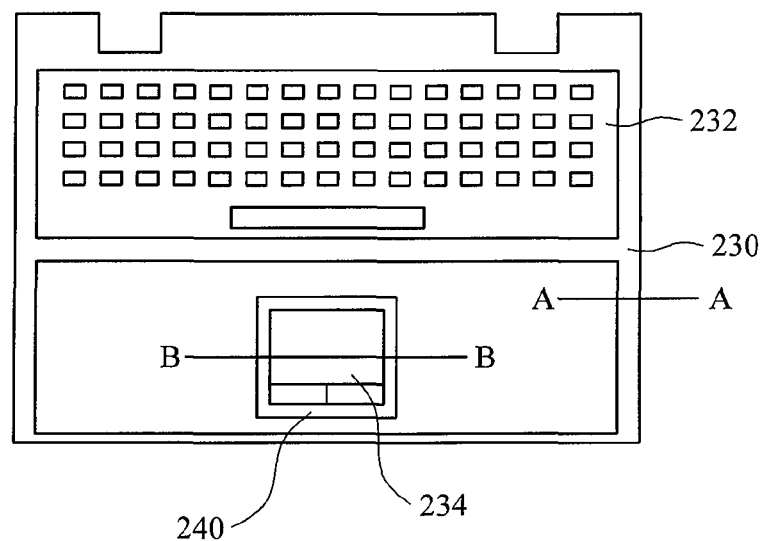
FIG. 3B is a schematic view of the disclosed upper cover and an electronic apparatus after the assembly.

With reference to FIG. 3A and FIG. 3B, the leather coating structure 200 in a preferred embodiment is used in a laptop computer. As shown in the drawing, the upper cover region 230 contains a keyboard 232 and a touch-control panel 234 below it. The material of the upper cover 230 can be plastic or metal. This is not limited by the invention.

The leather coating structure 200 of the upper cover in this embodiment is assembled onto the surrounding area of the touch-control panel 234 and has an inner opening 216 for accommodating the touch-control panel 234. The assembly of the leather coating structure 200 on the upper cover 230 can be done by thermal fusion, adhesion, or via a fixing element, such as a hook, screw, or interference, depending upon the type of product.

Preferably, the thickness of the extended portion 214 is reduced to 0.3~0.6 mm. By decreasing the thickness of the extended portion 214, the local protrusion at the bending edge can be reduced so that it looks smoother. The edge and bottom surface of the supporting plate 220 covered by the extended portion 214 can be reduced in thickness accordingly so that the extended portion is smoothly attached to the supporting plate 220. In other embodiments of the invention, a thicker leather is allowed by thinning the edge of the supporting plate 220.

As the leather coating layer is bent at the edge of the supporting plate, it is less likely to be separated from or peeled off from the apparatus because the extended portion and the top portion form a continuous leather coating layer.

Figure 4A:
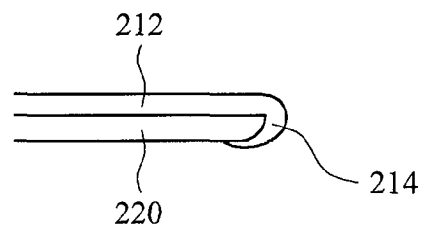
FIG. 4A is a cross-sectional view of FIG. 3B along the A-A line.
Figure 4B:
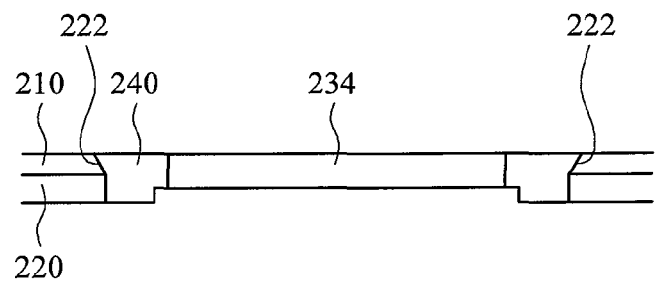
FIG. 4B is a cross-sectional view of FIG. 3B along the B-B line.

With simultaneous reference to FIG. 2A, FIG. 2B, and FIG. 4B, the leather coating structure 200 of the upper cover further includes a coating frame 240. In this embodiment, the supporting plate 220 has a supporting plate inner opening 216b corresponding to the leather coating layer inner opening 216a of the leather coating layer 210. Once the leather coating layer 210 is attached onto the supporting plate 220, the two openings together form the inner opening 216 of the leather coating structure 200 of the upper cover. The provision of this inner opening 216 is in accord with the touch-control panel input device 234. It provides an accommodating space for the touch-control panel input device 234.

When the top portion 212 of the leather coating layer 210 has an inner opening 216a, the edge 218 of the inner opening 216a cannot render a good bending due to the structural limitation. Therefore, the coating frame 240 is used to cover the edge 218 of the inner opening 216a of the leather coating layer 210. This prevents the rough edge 218 from being exposed and the material from being separated during operation. The coating frame 240 uses a plastic material. However, the material is not limited to plastic. Other materials such as metals can achieve the same effects too.

Preferably, the edge 218 of the inner opening of the leather coating layer is thinned to form a slant surface 222. In this case, the top portion 212 of the leather coating layer 210 maintains a flat surface without any protrusion after the coating frame 240 covers the edge 218.

Although the above embodiment uses the lower region of the keyboard 232 as an example to explain the position of the leather coating structure in the upper cover. However, it is not used to limit the scope of the invention. Any other region on the upper cover 230, such as the indicator region, can be implemented with the disclosed leather coating structure 200 according to needs. Such variations should be considered as part of the invention.

Figure 5:
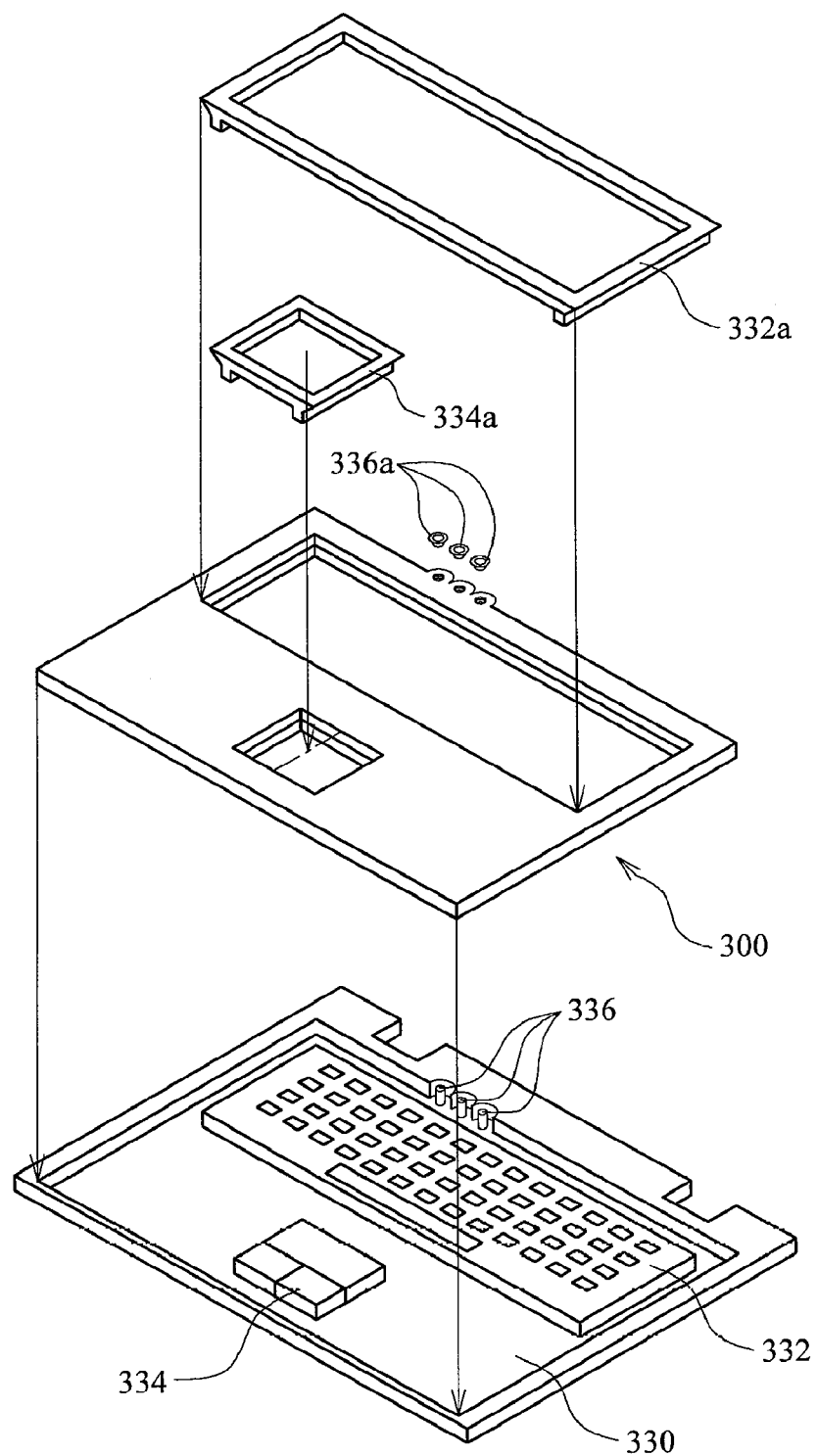
FIG. 5 is a schematic view of the disclosed leather coating structure according to another embodiment of the invention.

With reference to FIG. 5, another embodiment of the disclosed leather coating structure is to make a single leather coating structure on the entire upper cover region. Bending is also performed along the outer edge of the supporting plate. The inner openings for the keyboard 332, touch-control panel 334, indicator 336, and name plate (not shown) are also covered with the corresponding coating frames 332a, 334a, and 336a. The drawing shows that the leather coating structure 300 is assembled onto the upper cover 330 of an electronic apparatus.

Figure 6:
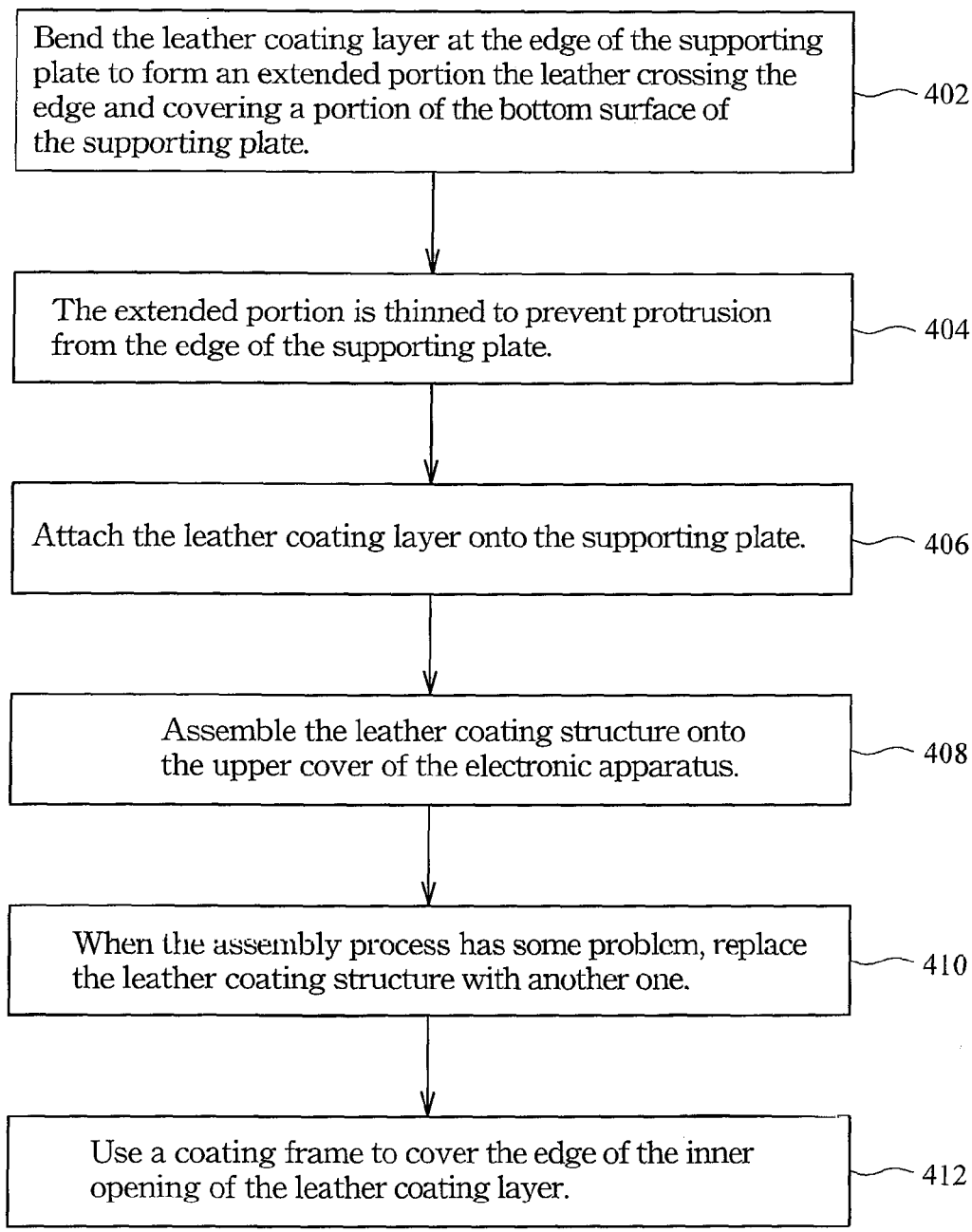
FIG. 6 is a flowchart of the disclosed method for manufacturing the upper cover.

With reference to FIG. 6, the method of manufacturing the disclosed leather coating structure for a case includes the following steps: a leather coating layer is attached on a supporting plate to form a leather coating structure, the leather coating layer is bent at the edge of the supporting plate to cover a portion of the bottom surface, the leather coating structure is assembled onto the upper cover of a portable electronic apparatus.

In a preferred embodiment of the invention, the manufacturing method is applied to the leather coating structure for a case of a laptop computer. In step 402, the leather coating layer is bent at the edge of the supporting plate to form an extended portion, the leather crossing the edge and covering a portion of the bottom surface of the supporting plate. The extended portion refers to the part from the bending edge to the edge of the leather coating layer. The area of the initial leather coating layer is sufficient to cover the entire supporting plate. The area of the extra material exceeds the edge of the supporting plate as the extended portion needed in the bending step. In step 404, the extended portion is thinned to prevent protrusion from the edge of the supporting plate.

In step 406, the leather coating layer is attached onto the supporting plate. For example, a NAPPA leather material is adhered onto a plastic or metal plate using an ordinary adhesive.

In step 408, the leather coating structure is assembled onto the upper cover of the electronic apparatus. For example, the supporting plate covered with the leather coating layer is connected to the upper cover region of the laptop computer by thermal fusion, adhesion, interference, or hooks. In step 410, only another leather coating structure is required if the assembly step mentioned above has any problems, such as improper thermal fusion. The upper cover does not need to be abandoned in its entirety.

In step 412, a coating frame is further used to cover the edge of the inner opening of the leather coating layer. This prevents the rough edge of the inner opening from being exposed. It also prevents the user from peeling the leather off from its edge during operation.

It should be noted that the edge of the supporting plate refers to the outer edge of the supporting plate, different from the edge of the inner opening.

According to the preferred embodiment, the invention has at least the following advantages. The leather coating layer is bent at the edge of the supporting plate to form a extended portion. This prevents the leather from being peeled when the user is operating the electronic apparatus. Therefore, the invention can maintain the smoothness of the leather coating layer on the upper cover and hide its rough edge. The electronic apparatus thus keeps a good appearance.

Moreover, the leather coating layer is integrated on the supporting plate in such a way that when the integrated structure is inappropriately assembled to the upper cover of an ordinary electronic apparatus, one only needs to replace it with another leather coating structure without abandoning the entire upper cover. Therefore, the separable feature of the disclosed coating structure provides the advantages of easy replacement and saves the cost for a new upper cover.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A leather coating structure for a case of a portable electronic apparatus, the leather coating structure comprising:
    a supporting plate having a top surface and a bottom surface; and
    a leather coating layer having a top portion contacted to the top surface of the supporting plate and an extended portion extending from edges of the top portion folded and contacted to a portion of the bottom surface of the same supporting plate, wherein the extended portion is hidden between the bottom surface of the supporting plate and the case of the portable electronic apparatus.

2. The leather coating structure of claim 1, wherein the supporting plate is made of a plastic material.

3. The leather coating structure of claim 1, wherein the supporting plate is made of a metal.

4. The leather coating structure of claim 1, wherein the thickness of the extended portion is thinner than the thickness of the top portion.

5. The leather coating structure of claim 1, further comprising an adhesive layer located between the supporting plate and the leather coating layer for adhering thereof.

6. The leather coating structure of claim 1 further comprising a coating frame and the top portion having an inner opening, wherein the coating frame covers the edge of the inner opening.

7. A laptop computer, comprising:
    a case, providing outer shielding for the laptop computer;
    an upper cover, assembling onto the case; and
    a leather coating structure, assembling inside the upper cover, comprising:
        a supporting plate having a top surface and a bottom surface and the supporting plate for assembling the upper cover; and
        a leather coating layer having a top portion contacted to the top surface of the supporting plate and an extended portion extending from the edge of the top portion folded and contacted to a portion of the bottom surface of the same supporting plate, wherein the extended portion is hidden between the bottom surface of the supporting plate and the case of the portable electronic apparatus.

8. The laptop computer as claimed in claim 7, wherein the supporting plate is made of a plastic material.

9. The laptop computer as claimed in claim 7, wherein the supporting plate is made of a metal.

10. The laptop computer as claimed in claim 7, wherein the thickness of extended portion is thinner than the thickness of the top portion.

11. The laptop computer as claimed in claim 7, further comprising an adhesive layer located between the supporting plate and the leather coating layer for adhering thereof.

12. The laptop computer as claimed in claim 7, wherein the supporting plate is located onto a top plate of the laptop computer.

13. The laptop computer as claimed in claim 7 further comprising a coating frame and the top portion having an inner opening, wherein the coating frame covering the edge of the inner opening.

14. A method for manufacture the laptop computer as claimed in claim 12, comprising assembling the supporting plate onto the upper cover by adhesion, screwing, thermal fusion, hooking, or interfering.

15. A method of manufacturing a leather coating structure used for a portable electronic apparatus having a supporting plate with a bottom surface inside an upper cover of the portable electronic apparatus and a leather coating layer, the method comprising the steps of:
    attaching the leather coating layer to the supporting plate to form the leather coating structure;

bending the leather coating layer at the edge of the supporting plate forming an extended portion to cover a portion of the bottom surface; and assembling the leather coating structure onto the upper cover of the portable electronic apparatus, wherein the extended portion is hidden between the bottom surface of the supporting plate and the upper cover of the portable electronic apparatus.

16. The method of claim 15, wherein the attaching step uses an adhesive.

17. The method of claim 15 further comprising the step of thinning the extended portion to reduce a protrusion at the edge.

18. The method of claim 15 further comprising the step of using a coating frame to cover an inner opening edge of the leather coating layer.

* * * * *